UNITED STATES PATENT OFFICE.

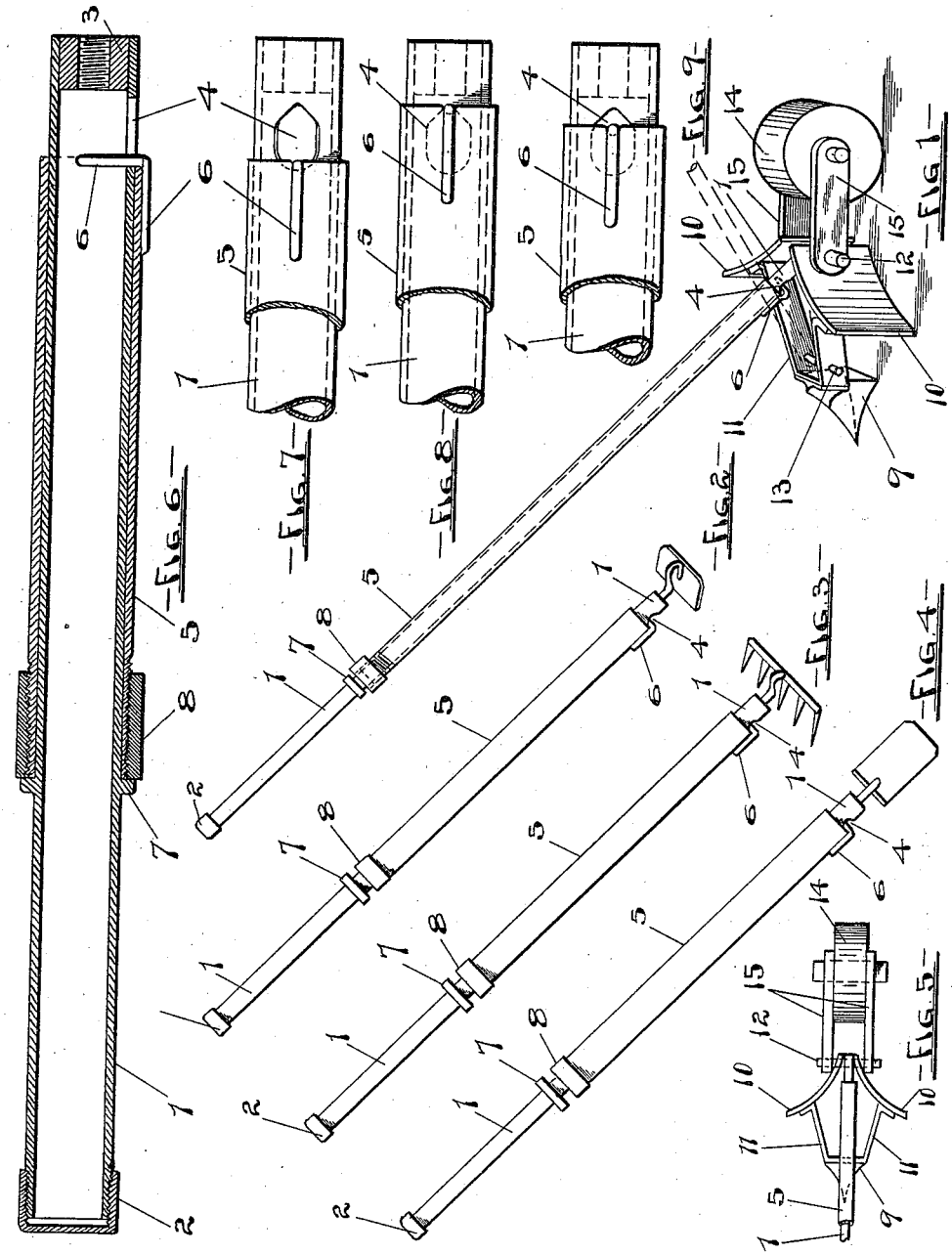

CECIL J. W. JAMES, OF PORTLAND, OREGON.

GARDEN IMPLEMENT.

1,179,726.      Specification of Letters Patent.      Patented Apr. 18, 1916.

Application filed August 23, 1915. Serial No. 46,845.

*To all whom it may concern:*

Be it known that I, CECIL J. W. JAMES, a citizen of the United States, residing at Portland, county of Multnomah, State of Oregon, have invented certain new and useful Improvements in Garden Implements, of which the following is a specification.

My invention relates to hand implements for use in gardening, and more particularly to a device for planting seed which is adapted for use with such implements.

The objects of my invention are to provide a seeding device that may be used in combination with any one of the ordinary hand implements, as a hoe, shovel, and the like; to provide a combination implement in which, to the seeding device, may be quickly attached or detached any ordinary garden implement, and in which the seeding device acts as the handle; to provide a manually operated seeding device that shall be strong, of simple construction, and economical of manufacture.

I attain the above objects by means of the construction illustrated in the accompanying drawing, which therefore forms a part of this application for Letters Patent, and in which:—

Figure 1 is a perspective view of one form of my invention. Figs. 2, 3 and 4 are perspective views showing various combinations of garden implements with the seeding device. Fig. 5 is a plan view of a portion of Fig. 1. Fig. 6 is an enlarged longitudinal sectional view of the seeding device detached from the implement. Fig. 7 is a side elevation of a portion of the seeding device showing the orifice completely open. Fig. 8 is a view similar to Fig. 7, showing the orifice entirely closed. Fig. 9 is a view similar to Fig. 7, showing the orifice partially open, as adjusted for small seeds.

Like characters of reference indicate like parts throughout the several views of the drawing.

In general, my invention consists of a hollow handle acting as a receptacle for the seeds, and having at the lower end thereof an adjustable orifice through which the seeds are dropped, means for conveniently opening and closing the orifice to control the dropping of the seeds, and means to attach to the lower end of the handle a garden implement.

The handle is constructed of a tube 1 having a cap 2 at the upper end thereof, the lower end of said handle being closed and threaded, as shown at 3 in Fig. 1, said threads being adapted to receive the threaded shank of a garden implement, as a hoe, rake, shovel, and the like, as shown in Figs. 2, 3 and 4. An orifice 4 is provided in tube 1 adjacent the lower end thereof, said orifice being of sufficient size to admit the passage of the largest of seeds. The tube 1 acts as a receptacle for the seed.

For the purpose of controlling the exit of the seed through orifice 4 there is provided a tube 5 freely mounted upon tube 1, and adapted to open or close orifice 4 by moving longitudinally upon tube 1.

To agitate the seeds for the purpose of preventing them from wedging into the bottom of tube 1 and thus clogging the orifice 4, there is provided an agitator 6 integrally attached to tube 5 and extending through orifice 4 into tube 1, as shown in Fig. 1.

For the purpose of providing a centering device for tube 5 upon tube 1, as well as to provide for the small orifice required for small seeds, the lower end of orifice 4 is brought substantially to a point adapted to receive agitator 6 when said orifice is entirely closed by tube 5, as shown in Fig. 8.

To provide a convenient adjustment for various sizes of seeds, a collar 7 is secured to tube 1 at a position substantially where the upper end of tube 5 will be located when the lower end of tube 5 has entirely opened orifice 4, as shown in Fig. 7, and a sleeve 8 is threaded upon the upper end of tube 5, said sleeve being adapted to contact with said collar 7. By means of this device, the tube 5 may be horizontally moved upon tube 1 within the limits imposed by the contact of sleeve 8 with collar 7, and the contact of agitator 6 with the lower end of orifice 4, and this limit of movement may be made so small by adjusting sleeve 8 as to regulate the opening of orifice 4 to the smallest of seeds.

The seeder, as above described, may be used as the handle of any ordinary garden implement having a threaded shank adapted to enter the threaded portion of tube 1, as shown in Figs. 2, 3 and 4, but to prepare the ground furrow, cover the seed and firm the ground after seeding, there is provided a plow 9 secured to a duality of flaring wings 10 by a brace 11, said plow being adapted to furrow the ground and said wing being adapted to return the earth removed by the plow and to level the ground.

The seeder device, acting as a handle, may be pivotally mounted between said wings upon a pin 12, in which position the implement is pulled along by the operator, or it may be pivotally mounted upon a pin 13 in brace 11 immediately adjacent plow 9, as shown in dotted lines in Fig. 1, in which position the implement is pushed along by the operator.

To firm the ground after seeding, a roller 14 is provided rotatably mounted between a pair of arms 15, which arms are pivotally mounted upon the wings 10 by pin 12.

My invention may be made of any size and constructed of any material deemed suitable and convenient for a device of this character, and while I have illustrated and described a preferred construction and arrangement of parts deemed desirable in materializing my invention, I wish to include in this application for Letters Patent, all mechanical equivalents and substitutes that may fairly be considered to come within the scope and purview of my invention as defined by the appended claim.

Having disclosed my invention so that others skilled in the art may be enabled to construct and use same, what I claim, is:—

A garden implement handle comprising a tubular receptacle for seeds, said receptacle having an orifice adjacent one end thereof, a tube freely mounted upon said tubular receptacle, an agitator attached to one end of said freely mounted tube and extending through said orifice into said tubular receptacle, a sleeve threaded upon said freely mounted tube at the end thereof opposite said agitator, a collar attached to said tubular receptacle adapted to contact with said sleeve, and means upon said tubular receptacle adjacent said orifice for attaching a garden implement.

In witness whereof I claim the foregoing as my own, I hereunto affix my signature in the presence of two subscribing witnesses.

CECIL J. W. JAMES.

Witnesses:
C. S. Brown,
D. G. Woodward.

Copies of this patent may be obtained for five cents each, by addressing the "Commissioner of Patents, Washington, D. C."